United States Patent
Aurongzeb et al.

(10) Patent No.: US 7,772,749 B2
(45) Date of Patent: Aug. 10, 2010

(54) WAVELENGTH FILTERING COATING FOR HIGH TEMPERATURE LAMPS

(75) Inventors: Deeder Aurongzeb, Mayfield Heights, OH (US); Philip Ellis, Willoughby, OH (US)

(73) Assignee: General Electric Company, Schenectady, NY (US)

( * ) Notice: Subject to any disclaimer, the term of this patent is extended or adjusted under 35 U.S.C. 154(b) by 557 days.

(21) Appl. No.: 11/799,430

(22) Filed: May 1, 2007

(65) Prior Publication Data

US 2008/0272682 A1 Nov. 6, 2008

(51) Int. Cl.
*H01J 43/00* (2006.01)

(52) U.S. Cl. ........................................ 313/112
(58) Field of Classification Search ................. 313/112, 313/580; 359/350, 885
See application file for complete search history.

(56) References Cited

U.S. PATENT DOCUMENTS

| 4,006,378 | A | 2/1977 | Silverstein et al. | |
| 4,345,000 | A | 8/1982 | Kawazoe et al. | |
| 4,490,227 | A | 12/1984 | Bitter | |
| 5,226,053 | A * | 7/1993 | Cho et al. | 372/45.01 |
| 6,153,982 | A * | 11/2000 | Reiners | 315/248 |
| 6,517,687 | B1 | 2/2003 | Iacovangelo | |
| 6,579,423 | B2 * | 6/2003 | Anzaki et al. | 204/192.15 |
| 2004/0106002 | A1 * | 6/2004 | Tului et al. | 428/689 |
| 2009/0009084 | A1 * | 1/2009 | Bonigk et al. | 313/633 |

FOREIGN PATENT DOCUMENTS

| DE | 10 2004 011 976 A1 | 9/2005 |
| JP | 07211162 A * | 8/1995 |
| JP | 09118544 A * | 5/1997 |
| JP | 2000169220 A * | 6/2000 |
| WO | WO 2007/093525 A1 | 8/2007 |
| WO | WO 2006/087368 A1 | 8/2008 |

OTHER PUBLICATIONS

PCT/US2008/05796 International Search Report, mailed Aug. 6, 2008.

* cited by examiner

*Primary Examiner*—Peter Macchiarolo
(74) *Attorney, Agent, or Firm*—Fay Sharpe LLP

(57) ABSTRACT

The invention relates to a discharge lamp having a thin film indium oxide coating on the interior lamp envelope surface that effectively reflects UV, near IR and microwave radiation while transmitting light in the visible spectrum, the lamp being a high temperature operating lamp.

12 Claims, 5 Drawing Sheets

WAVELENGTH FILTERING COATING FOR HIGH TEMPERATURE LAMPS

BACKGROUND OF THE INVENTION

The present disclosure relates to high intensity electric discharge lamps. It finds particular application in those instances where a high temperature lamp coating capable of transmitting visible light and filtering UV and microwave light is needed. However, it is to be appreciated that the present disclosure will have wide application throughout the lighting industry.

Lamps for which the present disclosure may prove suitable include any lamp characterized by the inclusion of a discharge envelope of quartz or ceramic containing a discharge-supporting filling of gas or vapor, for example. The lamp usually includes at least one pair of electrodes with a gap of at least 3 mm between which an electric discharge passes in operation of the lamp. An electric current is supplied to the electrodes from a source exterior to the lamp envelope via what is commonly called a ribbon seal. This seal generally comprises a strip of refractory metal foil, commonly of molybdenum, having one end thereof electrically connected to a respective electrode, and the opposite end in electrical contact with a refractory metal rod which passes through the end wall of the envelope to provide an external lead. The foil, electrodes, and lead rods are embedded in the fused silica envelope wall.

In some lamps, the quartz envelope is doped with cerium, which absorbs light in the ultraviolet (UV) wavelength range. However, use of this type of material suffers from several drawbacks. One such drawback is that doping of the internal lamp surface of the quartz envelope with cerium lowers the anneal point. Quartz generally maintains its integrity up to an operating temperature of about 1250° C., above which temperature the quartz begins to soften and eventually causes lamp failure. Doping the quartz with cerium, which absorbs unwanted UV emissions, unfortunately lowers the anneal point of the quartz by up to 100° C., thus making it operationally functional only to 1150° C. Ceramic envelopes, which are not susceptible to cerium doping, suffer from a lack of a suitable UV barrier.

Another drawback to using cerium doped quartz is that the inner lamp surface does not efficiently reflect the UV emissions, but instead absorbs this energy. As noted, the energy eventually causes the quartz to soften and fail. An additional problem is that the UV energy is not redirected for further use by such envelope compositions. Instead, the energy is wasted.

It is known to use internal lamp envelope coatings to address these issues. However, a continuing problem remains with regard to coatings suitable for high temperature application, which do not suffer from the noted drawbacks, including lowering of the anneal point which results in early lamp failure and wasted lamp energy.

The invention disclosed herein is intended to provide a lamp coating suitable for use at high temperatures. The coating contemplated herein, due to its composition, does not interact or react with quartz or ceramic envelope material, thus the envelope maintains its integrity, increasing overall lamp life and efficiency. The coating further efficiently reflects UV light back into the arc so that the energy from this light wavelength is not wasted. Similarly, unwanted microwave radiation is reflected back into the lamp interior as opposed to being transmitted. Use of the reflective coating herein results in improved thermal and electrical performance of the lamp.

BRIEF DESCRIPTION OF THE INVENTION

A discharge lamp is provided. The lamp includes an improved coating composition disposed on the internal surface of the lamp envelope. The improved coating is a high temperature coating that reflects UV and microwave light emissions, thereby reducing the opportunity for lamp failure resulting from absorption of the UV and microwave light energy by the envelope. In addition, lamp life is enhanced due to reflectance of the UV and microwave energy back into the arc and plasma to increase the operating temperature and light emitting stability of the lamp.

DETAILED DESCRIPTION OF THE INVENTION

Figure 1:
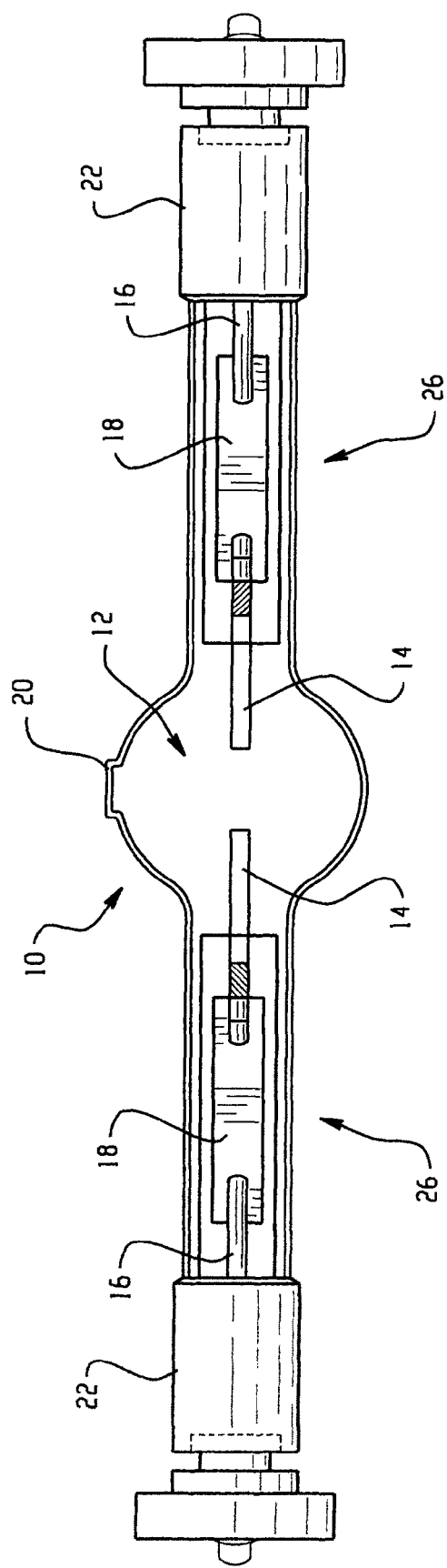
FIG. 1 shows diagrammatically and partially in section, a discharge lamp according to the present invention.

With reference to FIG. 1, there is shown a representative high intensity discharge lamp 10, which is generally known in the art. The high intensity discharge lamp 10 has a glass tube or light-transmissive envelope 12, which has a circular cross-section, and includes electrodes 14, lead rods 16, and foil(s) 18. The envelope 12 is hermetically sealed at both ends by bases 22. Deposited on the internal surface of envelope 12 is coating 20 according to the present invention. Coating 20 may be deposited on all or any part of the inner surface of envelope 12. The envelope is filled with a conventional fill gas, and the electrodes draw on an exterior power source, not shown, to produce an arc discharge.

High intensity discharge lamps may have envelopes composed of quartz or ceramic. Historically, quartz envelopes have been doped with cerium to facilitate reduction of the emission of potentially harmful ultraviolet (UV) radiation or light. The cerium dopant tends, however, to lower the anneal point of the quartz, thus reducing the lamp operational efficiency and ultimately the life of the lamp. Further, because the unwanted UV light is absorbed by the cerium, as opposed to being reflected, the light energy is wasted. Ceramic envelopes, which are not susceptible to cerium doping do not suffer the same reductions in efficiency, but also do not effectively block potentially harmful light emissions, such as UV or microwave radiation.

In one aspect of the invention, the foregoing problems are addressed by the application of a high temperature coating, suitable for use on quartz or ceramic lamp envelopes, that reflects unwanted UV and microwave emissions, while transmitting light in the visible wavelengths. The coating comprises at least indium oxide, and further at least one of tin oxide or zinc oxide.

More specifically, the coating composition may comprise, by atomic weight percent, at least about 0.01% to 42.0% nitrogen; about 25.0% to about 85.0% oxygen; about 0.01% to about 48.0% silicon; about 0.01% to about 45.0% indium; and about 0.01% to about 31.0% tin.

Figure 2:
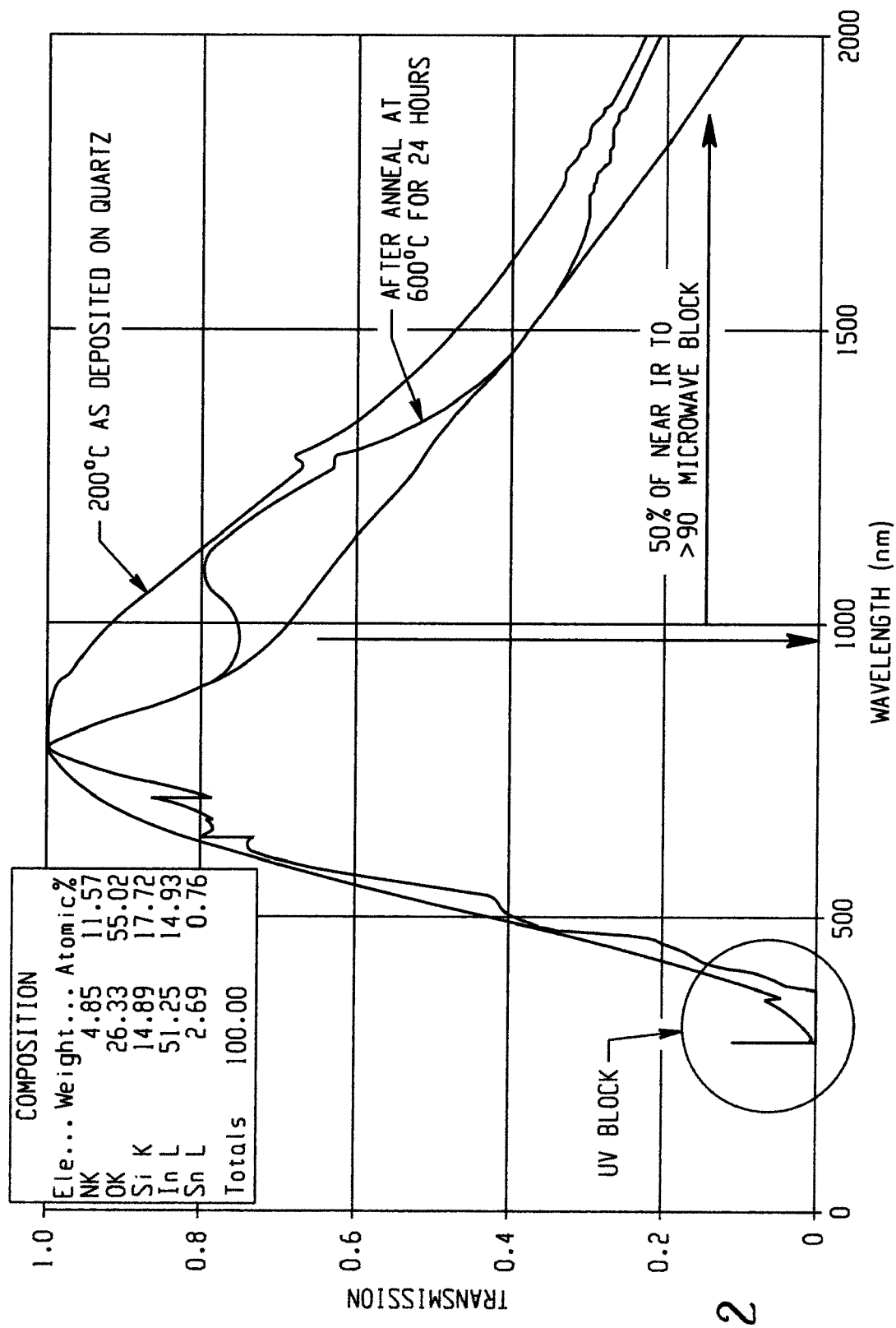
FIG. 2 is a graph showing effective blocking of UV and microwave light by the coating composition according to the present invention.

Now, with reference to FIG. 2, there is provided a graph showing transmittance of a lamp bearing the coating of the present invention as a function of the wavelength of the light transmitted. As is seen, the coating effectively blocks transmission of light at wavelengths below 400 nm, or in the ultra violet light range, which is potentially harmful to humans. The transmission of light increases dramatically in the 400-700 nm range, or visible spectrum, and then decreases again above 700 nm, blocking at least fifty percent (50%) of light emitting in the near infra red wavelengths and greater than ninety percent (90%) of emission in the microwave region of the spectrum. FIG. 2 was generated using a quartz envelope with a coating having the composition that follows, all percentages being by atomic weight:

| ELEMENT | WEIGHT | ATOMIC % |
|---------|--------|----------|
| Nitrogen | 4.85 | 11.57 |
| Oxygen | 26.33 | 55.02 |
| Silicon | 14.89 | 17.72 |
| Indium | 51.25 | 14.93 |
| Tin | 2.69 | 0.76 |

The light energy that is blocked by the coating, i.e., light at wavelengths below 400 nm and above 700 nm or IR and microwave light, is reflected back into the lamp. The UV light energy is reflected into the arc. This additional energy causes an increase in the arc temperature, making the arc more efficient and giving the lamp improved light emitting stability. The microwave light energy that is blocked by the coating is also reflected. In a lamp lacking the coating according to the invention, this light energy would likely interact with the lamp electronics, causing fluctuations in lamp current and performance. In a lamp with the coating deposited on the internal wall of the envelope, however, the microwave emission is reflected back into the lamp plasma where it is absorbed and dissipates without generating unwanted fluctuation in current and performance.

The coating of the present invention does not react with the quartz or ceramic envelope. Therefore, the lamp envelope does not experience the softening experienced, for example, with cerium-doped quartz at operating temperatures of at or near 1200° C. The coating of the invention exhibits a melting point in excess of 1500° C. and therefore is unaffected by such high temperature operating conditions.

Lamps bearing the coating according to the invention were tested to determine the time it would take for a lamp to emit light harmful to humans. The coating dramatically reduced the risk level. The test was a standard PET exposure time calculation, commonly used in the lighting industry and known as an ANSI standard. For this test, the coating was placed on an incandescent 1 kw halogen lamp envelope. Lamp performance before deposition of the coating showed low risk level emissions as early as 3.8 hours after initiating operation. In contrast, the same lamp bearing the coating showed no signs of potentially harmful emission even after 1,000 hours of operation. This level of performance is expected to be equivalent for high intensity discharge lamps in the range of 100-5000 W. A 150 W ceramic arc tube shows similar results with no degradation up to 100 hours.

Figure 3:
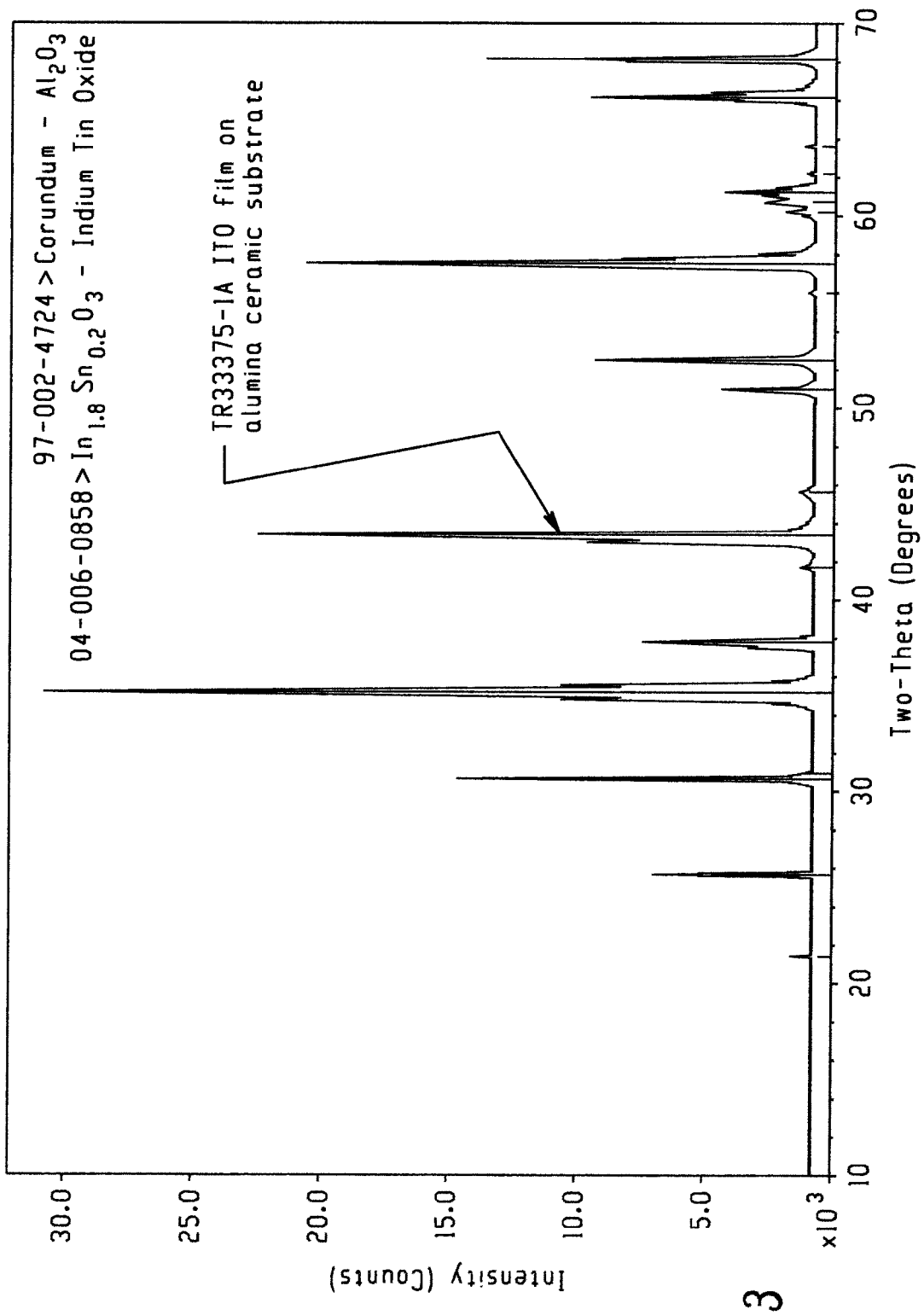
FIG. 3 is a scan of the elemental content of the coating according to the present invention upon deposition.
Figure 4:
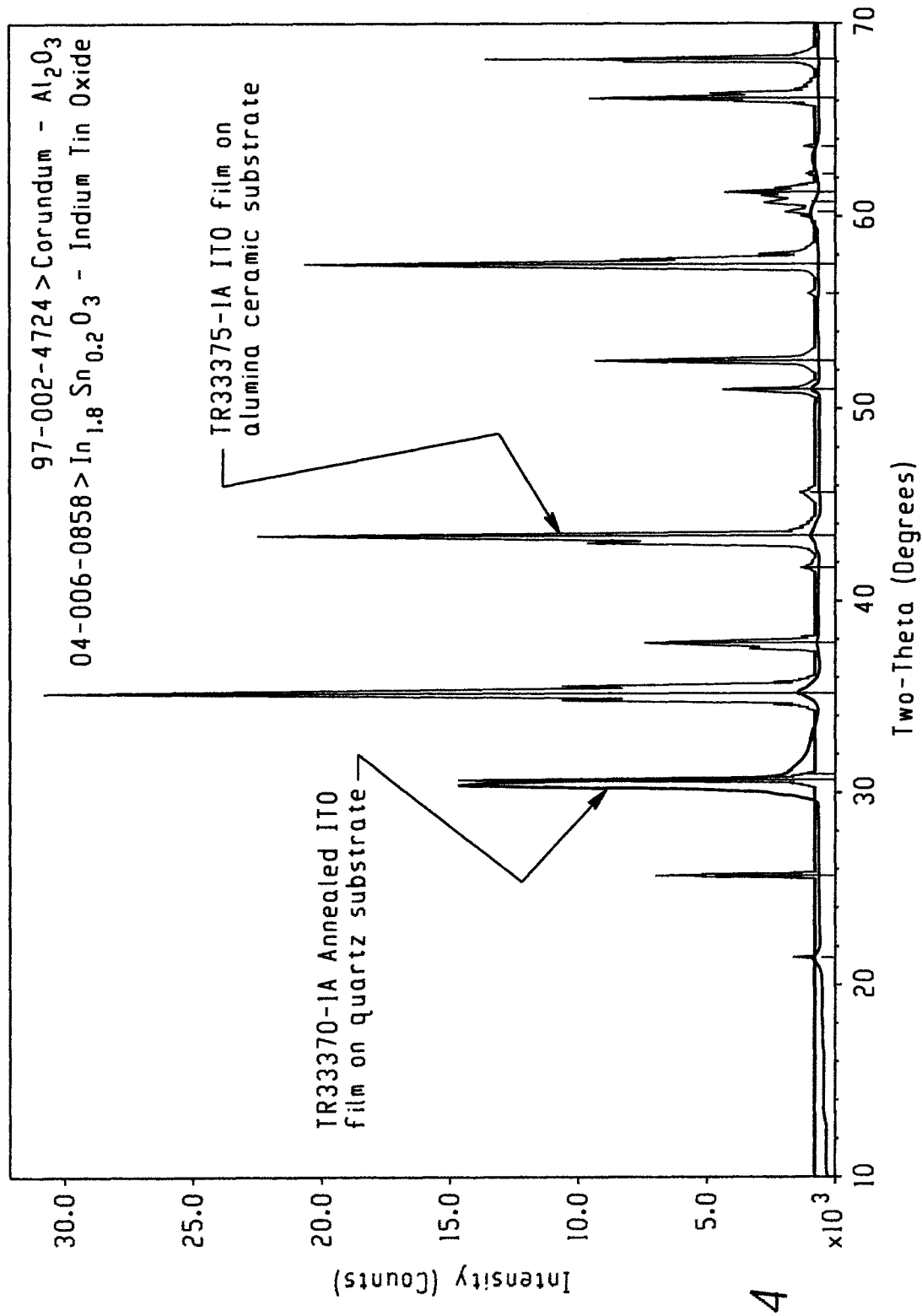
FIG. 4 a scan of the elemental content of the coating according to the present invention, but after fifty (50) hours of operation at high temperature.

Now, with respect to FIGS. 3 and 4, there is provided a spectroscopic analysis of the compound $In_{1.8}Sn_{0.2}O_3$, as an example of the coating of the present invention. Specifically, FIG. 3 shows peaks representative of the $In_{1.8}Sn_{0.2}O_3$ thin film coating, sputter coated on the inner wall of an alumina ceramic envelope at 200° C. FIG. 4 is a spectroscopic analysis of the same coating after 50 hours of burn time has elapsed and the lamp wall has reached an operating temperature of 1150° C. A comparison of FIGS. 3 and 4 shows no appreciable degradation in the coating. In fact, as the lamp burned, the crystal size of the indium tin oxide coating increased by about forty percent (40%), growing from about 11-20 nm at deposition to greater than 50 nm. This growth in crystal size indicates exceptional stability at high operating temperatures. The coating, due to the growth in crystal size, becomes more efficient at blocking undesirable UV and microwave emissions as operating time increases. Consequently, more energy is efficiently reflected back into the lamp interior, enhancing the arc temperature and stability and thereby enhancing lamp life and performance. In addition to the foregoing, it is apparent that the random orientation of the alumina ceramic substrate does not hinder the coating performance, and that the coating adapts well to the lack of orientation in the envelope substrate material.

In practice, the coating may be deposited by any known coating technique commonly used to coat lamp envelopes and similar substrates. The coating may be applied to or deposited on any quartz or ceramic lamp envelope substrate. It is not limited, however, to use on just these lamp envelope substrates, but may be used with any compatible substrate material and in any situation where it is desirable to reflect unwanted UV, near IR and microwave radiation. When deposited on a quartz envelope, for example $SiO_2$, one suitable coating composition includes indium oxide, tin oxide and silicon, among other coating components. For use on a ceramic envelope, for example $Al_2O_3$, the coating may be altered to include molybdenum, indium oxide, zinc oxide and aluminum. Common to these compositions is indium oxide or ZnO in combination with a Group B metal oxide. However, carbides, nitrides or bromides may also be used with good results. For example, suitable coatings may include indium oxide or zinc oxide in combination with carbides, nitrides and bromides selected from ZrO, ZrN, HfO, HfN, TaC, TiC, and titanium diboride, among others.

Figure 5:
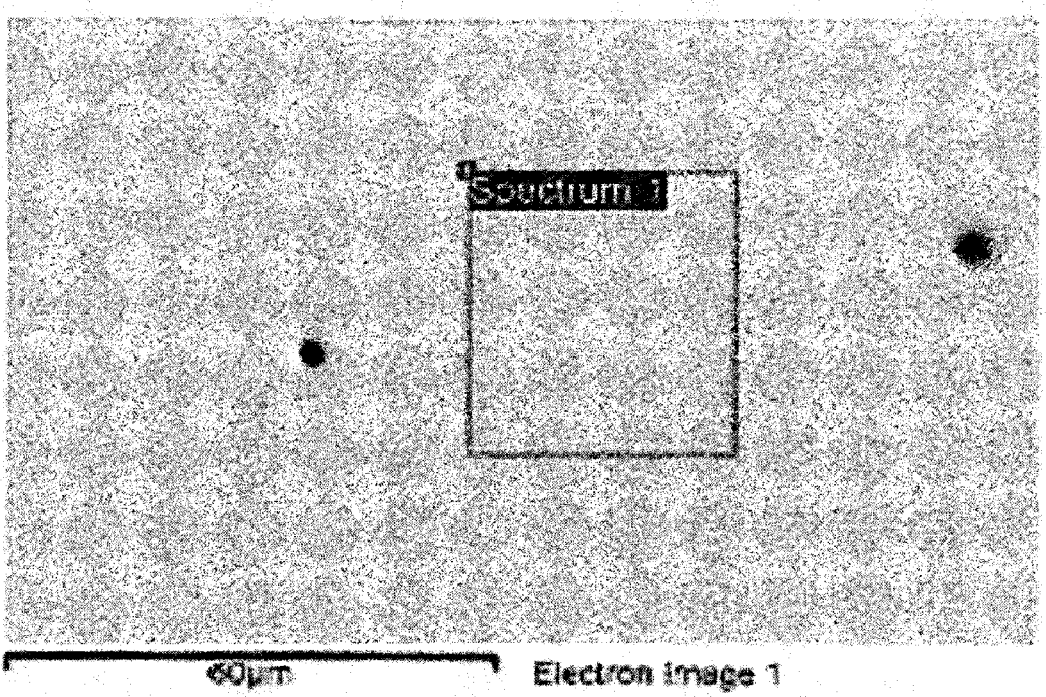
FIG. 5 is a SEM generated photomicrograph of a single layer coating under stress.
Figure 6:
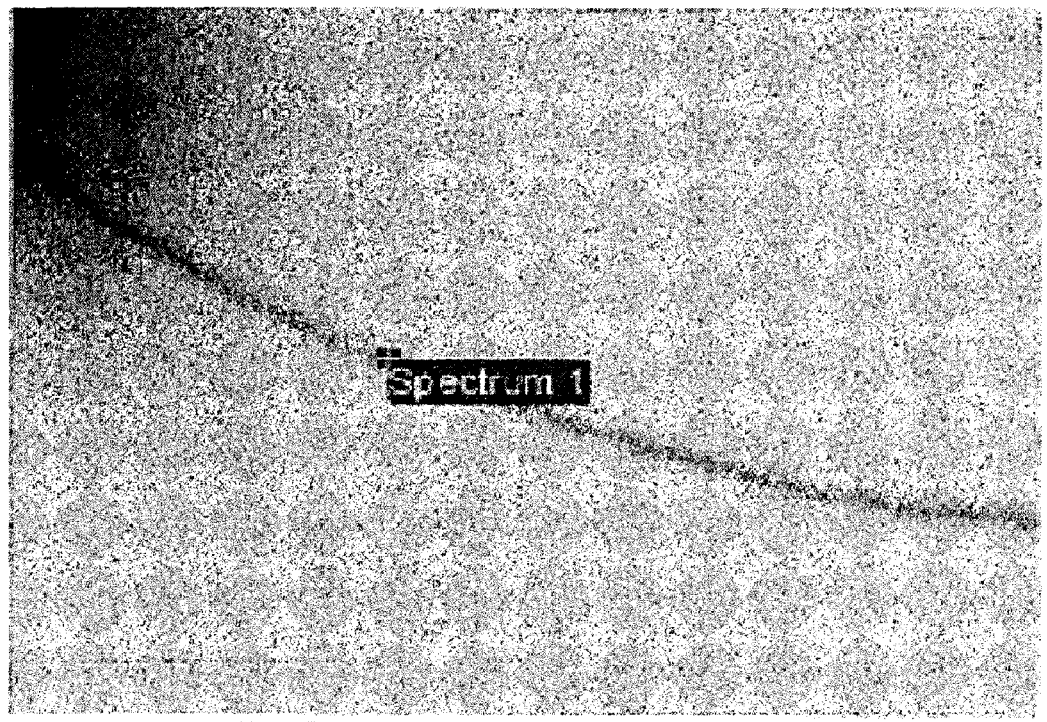
FIG. 6 is SEM generated photomicrograph of a multiple layer coating under stress.

Due to the curvature of the lamp envelope, stress experience by the lamp, for example stress resulting from high temperature or temperature variation, may cause a single layer coating to crack, disrupting the integrity and performance of the thin film coating. To offset this potential problem, the coating may be deposited in multiple layers. The layers may be of the same material, or of different coating compositions to tailor the performance of the overall coating to certain applications. Each layer may have the same thickness, for example about 200 nm, similar to the thickness of a single layer in single layer coatings, or may have varying thicknesses as long ad they do not exceed 1000 nm. When multiple coating layers are used, stress results in the formation of pores within the coating as opposed to cracks, as seen in FIGS. 5 and 6. FIG. 5 is a SEM of a single layer coating on a glass substrate. FIG. 6, however, is a SEM for the same coating composition coated in multiple layers on the glass substrate. The formation of random pores is much less harmful to lamp performance than cracks in the coating, which may readily propagate.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A lamp comprising:
an envelope; and
a source of light energy enclosed therein;
wherein the envelope is a quartz or ceramic glass envelope, and bears a coating on the interior surface thereof, the coating comprising:
indium oxide, silicon, nitrogen, and at least one of tin oxide or zinc oxide; and
the coating exhibiting an initial crystal size at deposition of about 20 nm, and after exposure to a high temperature operating condition, exhibiting a crystal size of up to about 50 nm;
the coating operable to reflect UV and microwave light energy from the source of light energy back into the interior of the lamp and transmit visible light energy;
wherein the lamp is operable at said high temperatures of at least about 1150° C.

2. The lamp of claim 1 wherein the envelope is quartz and the coating comprises at least: from about 0.01 atomic weight percent up to about 45.0 atomic weight percent indium; and from about 0.01 atomic weight percent up to about 31.0 atomic weight percent tin.

3. The lamp of claim 2 wherein the coating comprises $In_{1.8}Sn_{0.2}O_3$.

4. The lamp of claim 2 wherein the coating further comprises at least one of: from about 0.01 atomic weight percent up to about 42.0 atomic weight percent nitrogen; from about 0.01 atomic weight percent up to about 48.0 atomic weight percent silicon; and from about 25.0 atomic weight percent to about 85.0 atomic weight percent oxygen.

5. The lamp of claim 4 wherein the coating comprises 11.57% nitrogen, 55.02% oxygen, 17.72% silicon, 14.93% indium, and 0.76% tin, wherein all percentages are atomic weight percentages.

6. The lamp of claim 1 wherein the coating is deposited in a single layer.

7. The lamp of claim 1 wherein the coating is deposited in multiple layers.

8. The lamp of claim 7 wherein the multiple layers have the same composition.

9. The lamp of claim 7 wherein at least two of the multiple layers have different compositions.

10. The lamp of claim 1 wherein the envelope is ceramic and the coating comprises at least molybdenum, indium oxide, zinc oxide and aluminum.

11. The lamp of claim 1 wherein the coating as deposited functions to filter the transmission of light energy such that: less than 10% of ultraviolet light energy is transmitted; up to 99% of visible light energy at from about 400 nm to about 700 nm is transmitted; and less than 25% of microwave light energy is transmitted.

12. The lamp of claim 1 wherein after anneal at 600° C. for about 24 hours the coating functions to filter the transmission of light energy such that: less than 1% of ultraviolet light energy is transmitted; up to 99% of visible light energy at from about 400 nm to about 700 nm is transmitted; less than about 50% of near infrared light energy is transmitted; and less than 10% of microwave light energy is transmitted.

* * * * *